(12) United States Patent
Yamanouchi et al.

(10) Patent No.: US 7,011,699 B2
(45) Date of Patent: Mar. 14, 2006

(54) INKJET INK, INKJET RECORDING METHOD AND PRODUCTION METHOD OF INKJET INK

(75) Inventors: Junichi Yamanouchi, Kanagawa (JP); Takahiro Ishizuka, Kanagawa (JP); Yoshiharu Yabuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 212 days.

(21) Appl. No.: 10/721,265

(22) Filed: Nov. 26, 2003

(65) Prior Publication Data

US 2004/0106700 A1    Jun. 3, 2004

(30) Foreign Application Priority Data

Nov. 26, 2002    (JP)    ............................ P.2002-342249

(51) Int. Cl.
  *C09D 11/02*    (2006.01)
(52) U.S. Cl. .............. 106/31.13; 106/31.25; 106/31.26; 106/31.27; 106/31.33; 106/31.43; 106/31.46; 106/31.47; 106/31.48; 106/31.49; 106/31.5; 106/31.51; 106/31.52
(58) Field of Classification Search ............ 106/31.13, 106/31.25, 31.26, 31.27, 31.33, 31.43, 31.46–31.52
See application file for complete search history.

(56) References Cited

U.S. PATENT DOCUMENTS

| | | | | |
|---|---|---|---|---|
| 4,303,924 A | * | 12/1981 | Young, Jr. | ............... 347/102 |
| 5,508,421 A | * | 4/1996 | Suzuki et al. | ............ 548/262.4 |
| 6,342,094 B1 | * | 1/2002 | Kabalnov | ............... 106/31.25 |
| 6,521,031 B1 | * | 2/2003 | Kimura et al. | ........... 106/31.47 |

FOREIGN PATENT DOCUMENTS

| | | | |
|---|---|---|---|
| EP | 340722 | * | 11/1989 |
| EP | 1352754 | * | 10/2003 |
| JP | 03-231975 | * | 10/1991 |
| JP | 04-185672 | * | 7/1992 |
| JP | 09-059552 | * | 3/1997 |
| JP | 2001-181537 A | | 7/2001 |
| JP | 2001-181538 A | | 7/2001 |
| JP | 2001-181548 A | | 7/2001 |
| JP | 2001-181549 A | | 7/2001 |
| JP | 2001-247787 A | | 9/2001 |
| JP | 2001-247788 A | | 9/2001 |
| JP | 2001-279122 A | | 10/2001 |
| JP | 2001-279145 A | | 10/2001 |
| JP | 2001-294773 A | | 10/2001 |
| JP | 2001-302952 A | | 10/2001 |
| JP | 2001-342373 A | | 12/2001 |
| JP | 2002-121414 A | | 4/2002 |
| JP | 2002-309133 A | | 10/2002 |

* cited by examiner

*Primary Examiner*—Erma Cameron
(74) *Attorney, Agent, or Firm*—Sughrue Mion, PLLC

(57) ABSTRACT

The invention provides an inkjet ink which exhibits, at the printing particularly on paper, excellent ink permeability to eliminate the problem of soiling immediately after printing, can be polymerized in higher sensitivity after printing and enables the recording of an image excellent in water resistance and light fastness through polymerization curing, the inkjet ink comprising a coloring fine particle dispersion containing coloring fine particles and at least one oil-soluble dye, a polymerizable hydrophobic ethylenic unsaturated monomer and a polymerization initiator, the at least one oil-soluble dye having an oxidation potential of 1.0 V or more.

9 Claims, No Drawings

INKJET INK, INKJET RECORDING METHOD AND PRODUCTION METHOD OF INKJET INK

FIELD OF THE INVENTION

The present invention relates to an aqueous coloring fine particle dispersion, an inkjet ink comprising the coloring fine particle dispersion and an inkjet recording method using the ink. More specifically, the present invention relates to a coloring fine particle dispersion ensuring high-quality recorded image and excellent ejection stability and suitable for aqueous writing ink, aqueous printing ink, information recording ink and the like, an inkjet ink suitable for thermal, piezoelectric, electric field or acoustic inkjet system, and an inkjet recording method.

BACKGROUND OF THE INVENTION

Accompanying recent popularization of computers, an inkjet printer is widely used for printing letters or an image on paper, film, cloth or the like not only in offices but also at homes. As the inkjet ink, an oily ink, an aqueous ink and a solid-state ink are known but in view of production, handleability, odor, safety and the like, an aqueous ink is predominating.

However, many aqueous inks use a water-soluble dye which dissolves in the molecular state, therefore, despite high transparency and high color density, the aqueous ink is disadvantageous in that the water resistance is low due to water solubility of dye and when printed on so-called plain paper, bleeding is caused to seriously impair the printing quality, and also in that the light fastness is low.

For the purpose of solving these problems, an aqueous ink using a pigment or a disperse dye has been proposed and a large number of techniques thereon are disclosed (see, for example, JP-A-2000-63723 (the term "JP-A" as used herein means an "unexamined published Japanese patent application"). However, these aqueous inks have a problem that the water resistance is, though enhanced to a certain extent, not sufficiently high, the storage stability of the dispersion of pigment or disperse dye in the aqueous ink is poor and clogging readily occurs at the ink ejection port.

Furthermore, when recording is performed on a recording paper having provided on the surface thereof an ink-accepting layer containing a porous inorganic pigment (so-called photographic quality paper), which has been recently created to cope with demand for higher image quality in the inkjet technology, the aqueous ink using a pigment or a disperse dye exhibits poor permeation and the dye or pigment is readily stripped off from the surface by the rubbing with a hand.

For the purpose of solving this problem, a method of incorporating a dye into an acryl polymer, polyurethane or polyester dispersion particle has been proposed (see, for example JP-A-11-286637).

However, these dispersions are disadvantageous in that when a dye is incorporated to a desired concentration, a coloring particle excellent in the dispersion stability can be hardly obtained, and also in that the dye is stripped off, similarly to the aqueous ink using a pigment or disperse dye.

In view of adhesion to the substrate, a UV-curable inkjet ink comprising a polymerizable acrylate, a coloring agent and a UV photo-initiator and being excellent in the adhesion to a plastic substrate is disclosed (see, for example, British Patent No. 2,314,851). However, the coloring agents described in this patent publication all are a pigment dispersion and the color tone of the obtained color image is not satisfied. Furthermore, depending on the polymerizable acrylate selected, a problem arises in the dispersion stability of pigment and disadvantageously, coagulation of ink readily occurs.

When the coloring agent is changed to an oil-soluble dye so as to solve the problem of color tone of the obtained color image, this is found to incur problems that sufficiently high curability is not necessarily obtained due to inhibition of curing polymerization reaction by the oil-soluble dye, the polymerization takes a long time until completion, or huge energy is necessary.

SUMMARY OF THE INVENITON

An object of the present invention is to provide an inkjet ink and an inkjet recording method, where the handleability, safety and dispersion stability of coloring fine particle are excellent, the substrate dependency is not present, the printing on a freely selected substrate is ensured with excellent coloration/color tone, good resistance against water and light and no soiling immediately after printing, and the dye exhibits excellent stability in aging of ink. Another object of the present invention is to provide an inkjet ink and an ink-jet recording method, where the ink permeability at the printing particularly on paper is excellent to eliminate the problem of soiling immediately after printing, a polymerization reaction can be performed in higher sensitivity after printing, and an image excellent in water resistance and light fastness can be recorded by the polymerization curing.

The means to attain these objects and preferred embodiments thereof are as follows.

That is,

1. An inkjet ink comprising:
a coloring fine particle dispersion containing at least one oil-soluble dye;
a polymerizable hydrophobic ethylenic unsaturated monomer; and
a polymerization initiator,
wherein the at least one oil-soluble dye has an oxidation potential of 1.0 V or more.

2. The inkjet ink as described in 1, wherein the at least one oil-soluble dye is a compound represented by the following formula (M-I):

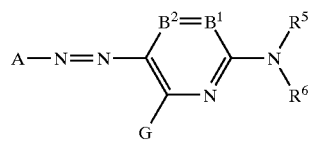

wherein A represents a residue of a 5-membered heterocyclic diazo component A-NH$_2$; B$^1$ and B$^2$ each represents —CR$^1$— or —CR$^1$— or either one of B$^1$ and B$^2$ represents a nitrogen atom and the other represents —CR$^1$— or —CR$^2$—; R$^5$ and R$^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that R$^5$ and R$^6$ are not a hydrogen atom at the same time; G, R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group or a heterocyclic thio group, and each group may be further substituted; and $R^1$ and $R^5$, or $R^5$ and $R^6$ may combine to form a 5- or 6-membered ring.

3. The inkjet ink as described in 1 or 2, wherein the coloring fine particle dispersion conatins the ethylenic unsaturated monomer in an amount of from 25 to 90 wt %.

4. The inkjet ink as described in any one of 1 to 3, wherein the coloring fine particle dispersion contains the polymerization initiator.

5. The inkjet ink as described in any one of 1 to 4, wherein the polymerization initiator is a polymerization initiator capable of generating a radical on heating or irradiation of an ultraviolet ray.

6. The inkjet ink as described in any one of 1 to 5, wherein the hydrophobic ethylenic unsaturated monomer has a boiling point of 150° C. or more.

7. The inkjet ink as described in any one of 1 to 6, wherein coloring fine particles in the coloring fine particle dispersion have a volume average particle size of from 1 to 300 nm.

8. The inkjet ink as described in any one of 1 to 7, which has a viscosity of 10 mPa·s or less.

9. The inkjet ink as described in 2, wherein the compound represented by formula (M-I) is a compound represented by the following formula (M-II):

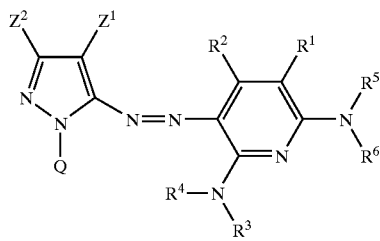

whererin $Z^1$ represents an electron-withdrawing group having a Hammett's substituent constant σp value of 0.20 or more; $R^1$, $R^2$, $R^5$ and $R^6$ have the same meanings as in the formula (M-I), respectively; $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; $Z^2$ represents a hydrogen atom, an aliphatic group, an aromatic group or a heterocyclic group; Q represents a hydrogen atom, an aliphatic group, an aromatic group or a heterocyclic group.

10. An inkjet recording method comprising:
recording an image by using the inkjet ink described in any one of 1 to 9; and
then polymerizing the hydrophobic ethylenic unsaturated monomer.

11. The inkjet recording method as described in 10, wherein the image is recorded on an image-receiving material comprising a support having thereon an ink-accepting layer containing a porous inorganic pigment.

12. A method for producing an inkjet ink, which is the inkjet ink described in any one of 1 to 9, comprising emulsion-dispersing a solution containing a hydrophobic ethylenic unsaturated monomer and an oil-soluble dye in an aqueous medium to obtain a coloring fine particle dispersion.

DETAILED DESCRIPTION OF THE INVENTION (Inkjet Ink)
The inkjet ink of the present invention is described below.
The inkjet ink of the present invention comprises a polymerizable hydrophobic ethylenic unsaturated monomer, a coloring fine particle dispersion containing at least an oil-soluble dye having an oxidation potential of 1.0 V or more, and a polymerization initiator.

<Coloring Fine Particle Dispersion>
The coloring fine particle dispersion is described below.
The coloring fine particle dispersion for use in the present invention is a dispersion where a polymerizable ethylenic unsaturated monomer and a coloring fine particle containing at least an oil-soluble dye are dispersed in an aqueous medium.
More specifically, the coloring fine particle dispersion for use in the present invention is a dispersion where a polymerizable ethylenic unsaturated monomer and an oil-soluble dye-containing coloring fine particle are dispersed as a fine particulate oil droplet in an aqueous medium to provide a so-called emulsified state.
The "aqueous medium" as used in the present invention means water or a mixture of water and a slight amount of water-miscible organic solvent, where additives such as surfactant, wetting agent, stabilizer and antiseptic are added, if desired.

<Oil-Soluble Dye>
In the coloring fine particle dispersion of the present invention, the oxidation potential of the oil-soluble dye is preferably 1.0 V (vs SCE) or more so as to efficiently polymerize the polymerizable ethylenic unsaturated monomer. A nobler oxidation potential is more preferred and the oxidation potential is preferably 1.1 V (vs SCE) or nobler and more preferably 1.2 V (vs SCE) or nobler. In the case of the magenta dye, when the color of image obtained and the image preservability are also considered, the dye represented by formula (M-I) is particularly preferred.
The dye represented by formula (M-I) for use in the present invention is described in detail below.
In formula (M-I), A represents a residue of a 5-membered heterocyclic diazo component A-NH$_2$; $B^1$ and $B^2$ each represents —CR$^1$= or —CR$^2$= or either one of $B^1$ and $B^2$ represents a nitrogen atom and the other represents —CR$^1$= or —CR$^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group or a heterocyclic thio group, and each group may be further substituted; and $R^1$ and $R^5$, or $R^5$ and $R^6$ may combine to form a 5- or 6-membered ring.

The dye of formula (M-I) is described in more detail below.

In formula (M-I), A represents a residue of a 5-membered heterocyclic diazo component $A-NH_2$. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring represented by A include a pyrazole ring, an imidazole ring, a thiazole ring, an isothiazole ring, a thiadiazole ring, a benzothiazole ring, a benzoxazole ring, a benzisothiazole ring and a triazole ring. Each heterocyclic group may further have a substituent. Among these, preferred are a pyrazole ring, an imidazole ring, an isothiazole ring, a thiadiazole ring, a benzothiazole ring and a triazole ring represented by the following formulae (a) to (f):

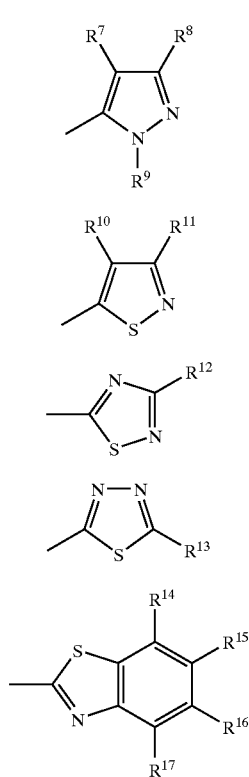

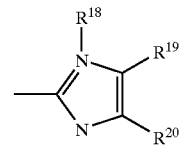

In formulae (a) to (f), $R^7$ to $R^{20}$ each represents the same substituent as described for G, $R^1$ and $R^2$.

Among formulae (a) to (f), preferred are a pyrazole ring and an isothiazole ring represented by formulae (a) and (b), and most preferred is a pyrazole ring represented by formula (a).

$B^1$ and $B^2$ each represents $-CR^1=$ or $-CR^2=$ or either one of $B^1$ and $B^2$ represents a nitrogen atom and the other represents $-CR^1=$ or $-CR^2=$. $B^1$ and $B^2$ each preferably represents $-CR^1=$ or $-CR^2=$. $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R^5$ and $R^6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. Each group may further have a substituent. However, $R^5$ and $R^6$ are not a hydrogen atom at the same time.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group (including an anilino group), an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group or a sulfamoyl group, and each group may be further substituted. The substituent represented by G is preferably a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an alkylamino group, an arylamino group and a heterocyclic amino group) or an acylamino group, and most preferably a hydrogen atom, an arylamino group or an amido group. Each group may further have a substituent.

The substituent represented by $R^1$ and $R^2$ is preferably a hydrogen atom, an alkyl group, an alkoxycarbonyl group, a carboxyl group, a carbamoyl group or a cyano group. Each group may further have a substituent.

$R^1$ and $R^5$, or $R^5$ and $R^6$ may combine to form a 5- or 6-membered ring. When the substituents represented by A, $R^1$, $R^2$, $R^5$, $R^6$ and G each further has a substituent, examples of the substituent include the substituents described above for G, $R^1$ and $R^2$.

In the present invention, the aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

In the present invention, the aromatic group means an aryl group and a substituted aryl group. The aryl group is preferably phenyl or naphthyl, more preferably phenyl. The number of carbon atoms in the aromatic group is preferably from 6 to 20, more preferably from 6 to 16. Examples of the aromatic group include a phenyl group, a p-tolyl group, a p-methoxyphenyl group, an o-chlorophenyl group and an m-(3-sulfopropylamino)phenyl group. The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

Examples of the alkylsulfonyl group and arylsulfonyl group include a methanesulfonyl group and a phenylsulfonyl group.

Examples of the alkylsulfinyl group and arylsulfinyl group include a methanesulfinyl group and a phenylsulfinyl group.

The acyl group includes an acyl group having a substituent and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

Examples of the halogen atom include a fluorine atom, a chlorine atom and a bromine atom.

The amino group includes an amino group substituted by an alkyl group, an aryl group or a heterocyclic group and the alkyl group, aryl group and heterocyclic group each may further have a substituent. An unsubstituted amino group is not included. The alkylamino group is preferably an alkylamino group having from 1 to 6 carbon atoms. Examples of the substituent include an ionic hydrophilic group. Examples of the alkylamino group include a methylamino group and a diethylamino group. The arylamino group includes an arylamino group having a substituent and an unsubstituted arylamino group. The arylamino group is preferably an arylamino group having from 6 to 12 carbon atoms. Examples of the substituent include a halogen atom and an ionic hydrophilic group. Examples of the arylamino group include an anilino group and a 2-chlorophenylanilino group.

The alkoxy group includes an alkoxy group having a substituent and an unsubstituted alkoxy group. The alkoxy group is preferably an alkoxy group having from 1 to 12 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 12 carbon atoms. Examples of the substituent include an alkoxy group and an ionic hydrophilic group. Examples of the aryloxy group include a phenoxy group, a p-methoxyphenoxy group and an o-methoxyphenoxy group.

The acylamino group includes an acylamino group having a substituent. The acylamino group is preferably an acylamino group having from 2 to 12 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 12 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 12 carbon atoms. Examples of the substituent include an ionic hydrophilic group. Examples of the alkoxycarbonylamino group include an ethoxycarbonylamino group.

The alkylsulfonylamino group and arylsulfonylamino group include an alkyl sulfonylamino group having a substituent, an arylsulfonylamino group having a substituent, an unsubstituted alkylsulfonylamino group and an unsubstituted arylsulfonylamino group. The sulfonylamino group is preferably a sulfonylamino group having from 1 to 12 carbon atoms. Examples of the substituent include an ionic hydrophilic group. Examples of the sulfonylamino group include a methanesufonylamino group, an N-phenylmethanesulfonylamino group, a benzenesulfonylamino group and a 3-carboxybenzenesulfonylamino group.

The carbamoyl group includes a carbamoyl group having a substituent and an unsubstituted carbamoyl group. Examples of the substituent includes an alkyl group. Examples of the carbamoyl group include a methylcarbamoyl group and a dimethylcarbamoyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 12 carbon atoms. Examples of the substituent include an ionic hydrophilic group. Examples of the alkoxycarbonyl group include a methoxycarbonyl group and an ethoxycarbonyl group.

The acyloxy group includes an acyloxy group having a substituent and an unsubstituted acyloxy group. The acyloxy group is preferably an acyloxy group having from 1 to 12 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The aryloxycarbonyl group includes an aryloxycarbonyl group having a substituent and an unsubstituted aryloxycarbonyl group. The aryloxycarbonyl group is preferably an aryloxycarbonyl group having from 7 to 12 carbon atoms. Examples of the substituent include an ionic hydrophilic group. Examples of the aryloxycarbonyl group include a phenoxycarbonyl group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 12 carbon atoms. Examples of the substituent include an ionic hydrophilic group. Examples of the aryloxycarbonylamino group include a phenoxycarbonylamino group.

The alkylthio group, arylthio group and heterocyclic thio group include an alkylthio group having a substituent, an arylthio group having a substituent, a heterocyclic thio group having a substituent, an unsubstituted alkylthio group, an unsubstituted arylthio group and an unsubstituted heterocyclic thio group. The alkylthio group, arylthio group and heterocyclic thio group are preferably an alkylthio group having from 1 to 12 carbon atoms, an arylthio group having from 1 to 12 carbon atoms and a heterocyclic thio group having from 1 to 12 carbon atoms. Examples of the substituent include an ionic hydrophilic group. Examples of the alkylthio group, arylthio group and heterocyclic thio group include a methylthio group, a phenylthio group and a 2-pyridylthio group.

In the present invention, the structure is particularly preferably a structure represented by the following formula (M-II):

Formula (M-II):

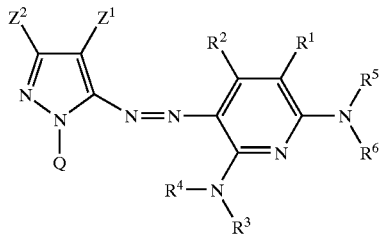

In the formula, $Z^1$ represents an electron-withdrawing group having a Hammett's substituent constant σp value of 0.20 or more. $Z^1$ is preferably an electron-withdrawing group having a σp value of 0.30 to 1.0. Specific preferred examples of this substituent include electron-withdrawing substituents described later. Among those, preferred are an acyl group having from 2 to 12 carbon atoms, an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms and a halogenated alkyl group having from 1 to 12 carbon atoms, more preferred are a cyano group, an alkylsulfonyl group having from 1 to 12 carbon atoms and an arylsulfonyl group having from 6 to 18 carbon atoms, and most preferred is a cyano group.

$R^1$, $R^2$, $R^5$ and $R^6$ have the same meanings as in formula (M-I). $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group. $Z^2$ represents a hydrogen atom, an aliphatic group, an aromatic group or a heterocyclic group. Q represents a hydrogen atom, an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The groups described in regard to formula (M-II) each may further have a substituent. When these groups each further have a substituent, examples of the substituent include the substituents described in regard to formula (M-I) and the groups described as examples for G, $R^1$ and $R^2$.

Here, the Hammett's substituent constant σp value used in the present invention is described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a am value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described using the Hammett's substituent constant σp value but this does not mean that the substituent is limited only to those having a known value which can be found in the above-described publications. Needless to say, the substituent includes substituents of which up value is not known in publications but when measured based on the Hammett's rule, falls within the range specified. Furthermore, although formulae (1) and (2) of the present invention include those which are not a benzene derivative, the up value is used as a measure for showing the electron effect of the substituent irrespective of the substitution site. In the present invention, the σp value is used in this meaning.

Examples of the electron-withdrawing group having a Hammett's substituent constant $\sigma_p$ value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's $\sigma_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $\sigma_p$ value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a $\sigma_p$ value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl). Specific examples of the electron-withdrawing group having a σp value of 0.20 or more include, in addition to those described above, a halogen atom.

In the azo dye represented by formula (M-I), the preferred combination of substituents is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an amido group, more preferably a hydrogen atom, a halogen atom, an amino group or an amido group, and most preferably a hydrogen atom, an amino group or an amido group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is —$CR^1$= or —$CR^2$=, and $R^1$ and $R^2$ each is preferably a hydrogen atom, a halogen atom, a cyano group, a carbamoyl group, a carboxyl group, an alkyl group, a hydroxyl group or an alkoxy group, more preferably a hydrogen atom, a cyano group, a carbamoyl group or an alkoxy group.

As for the preferred combination of substituents in the compound represented by formula (M-I), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (M-I) are set forth below with an oxidation potential thereof, however, the azo dye for use in the present invention is not limited to those set forth below. In the following Table, OP means Oxidation Potential.

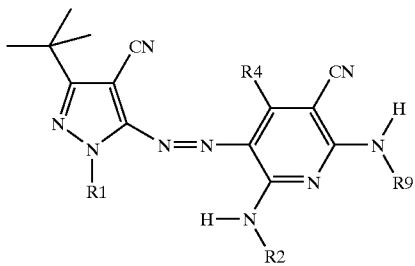

| | R1 | R2 | R3 | R4 | OP |
|---|---|---|---|---|---|
| a-1 | 2-benzothiazolyl | 4-n-C$_8$H$_{17}$-phenyl | 4-n-C$_8$H$_{17}$-phenyl | CH$_3$ | 1.37 |
| a-2 | 6-OMe-2-benzothiazolyl | 4-n-C$_8$H$_{17}$-phenyl | 4-n-C$_8$H$_{17}$-phenyl | CH$_3$ | 1.39 |
| a-3 | 2-benzothiazolyl | 2,4,6-trimethylphenyl | 2,4,6-trimethylphenyl | CH$_3$ | 1.35 |
| a-4 | 5,6-dichloro-2-benzothiazolyl | 4-n-C$_8$H$_{17}$-phenyl | 4-n-C$_8$H$_{17}$-phenyl | CH$_3$ | 1.27 |
| a-5 | 6-methyl-2-benzothiazolyl | 4-n-C$_8$H$_{17}$-phenyl | 4-n-C$_8$H$_{17}$-phenyl | CH$_3$ | 1.40 |
| a-6 | 2,4,5-tricyano-phenyl | COCH$_3$ | 4-n-C$_{12}$H$_{25}$-phenyl | H | 1.22 |
| a-7 | 5-chloro-2,4-dicyano-phenyl | COCH$_3$ | —N(CH$_2$CHC$_4$H$_9$)$_2$ with C$_2$H$_5$ | H | 1.18 |

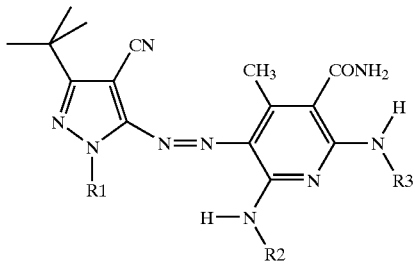

-continued

| | R1 | R2 | R3 | OP |
|---|---|---|---|---|
| a-8 | 2-benzothiazolyl | 4-n-C$_8$H$_{17}$-phenyl | 4-n-C$_8$H$_{17}$-phenyl | 1.14 |
| a-9 | 2-benzothiazolyl | 2,3,5-trimethylphenyl (mesityl-like: CH$_3$ at 2,3,5 positions) | 2,3,5-trimethylphenyl | 1.17 |

Structure:

Pyrazole (3-tert-butyl, 4-CN, N1-R1) — N=N — pyridine (with CH$_3$, NR2R3, and NH-R4 substituents)

| | R1 | R2 | R3 | R4 | OP |
|---|---|---|---|---|---|
| a-10 | 2-benzothiazolyl | 2-benzothiazolyl | 2,3,5-trimethylphenyl | 2,3,5-trimethylphenyl | 1.37 |
| a-11 | 2-benzothiazolyl | H | 2,3,5-trimethylphenyl | 2,3,5-trimethylphenyl | 1.20 |
| a-12 | 2-benzothiazolyl | H | 4-n-C$_8$H$_{17}$-phenyl | 4-n-C$_8$H$_{17}$-phenyl | 1.14 | a-13 — OP = 1.34

Structure: 3-tert-butyl-4-cyano-1-(2,4,5-tricyanophenyl)pyrazol-5-yl — N=N — pyrazine substituted with N(CH$_2$CHC$_4$H$_9$)$_2$ bearing C$_2$H$_5$, and NH-C(=O)-CH$_3$.

-continued
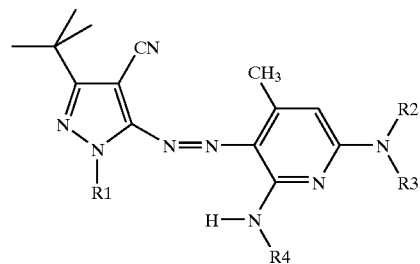
| | R1 | R2 |
|---|---|---|
| a-14 | 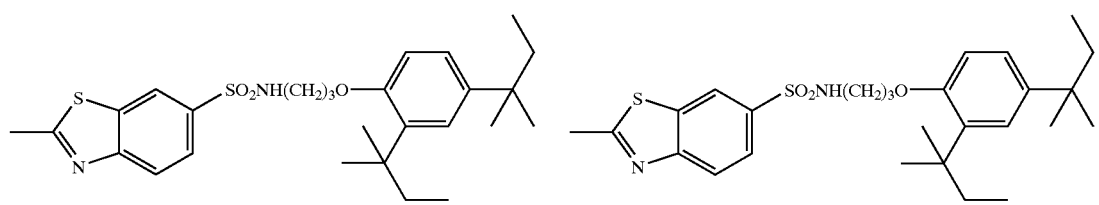 | |
| a-15 | 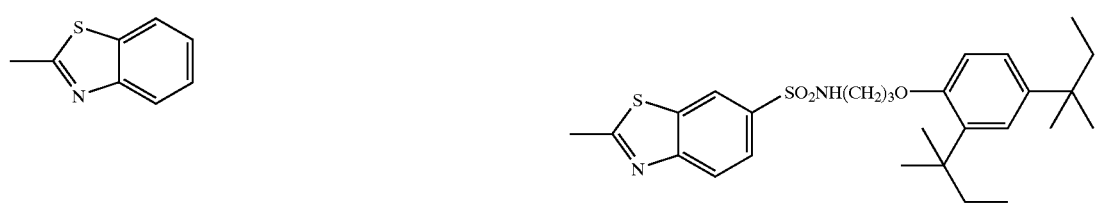 | |
| a-16 | 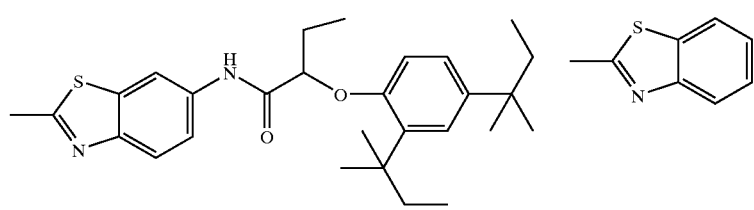 | |
| a-17 | 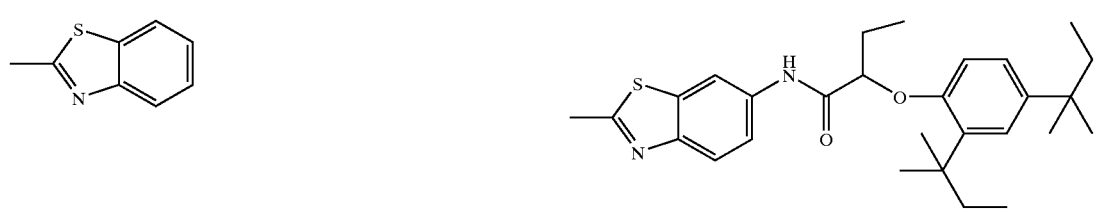 | |
| a-18 | 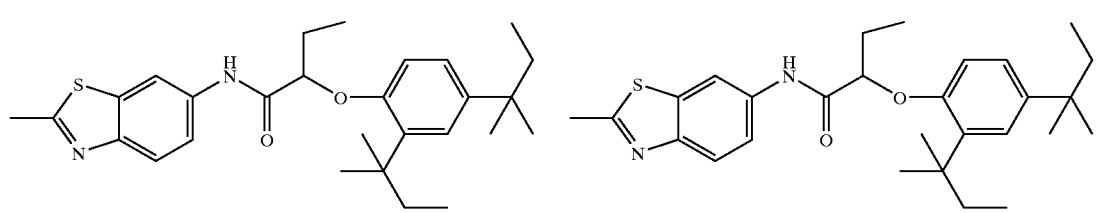 | |
| a-19 | 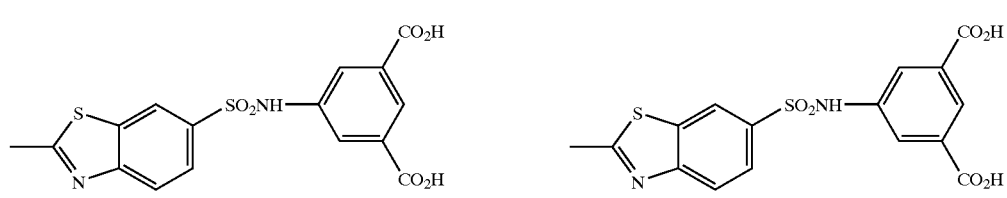 | |

-continued
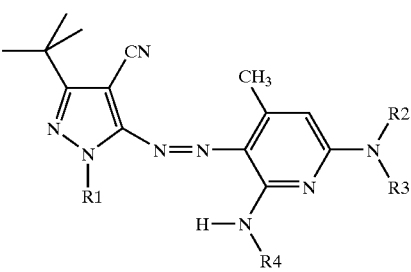
| | | R3 | R4 | OP |
|---|---|---|---|---|
| | a-14 | 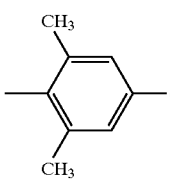 | 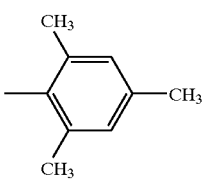 | 1.43 |
| | a-15 | 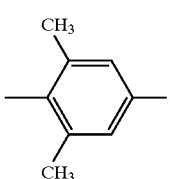 | 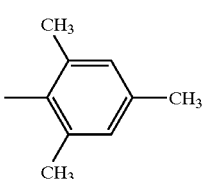 | 1.41 |
| | a-16 | 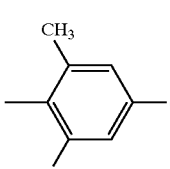 | 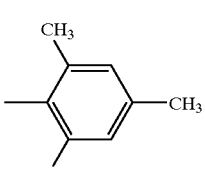 | 1.38 |
| | a-17 | 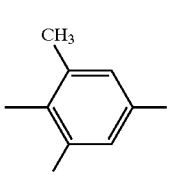 | 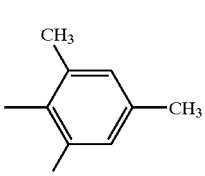 | 1.43 |
| | a-18 | 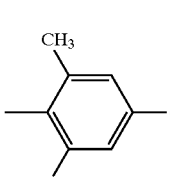 | 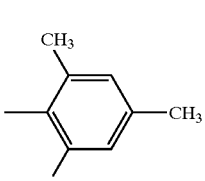 | 1.47 |
| | a-19 | 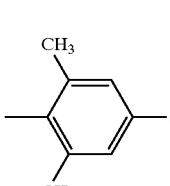 | 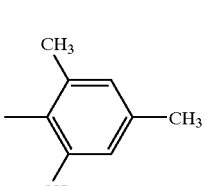 | 1.36 |

-continued

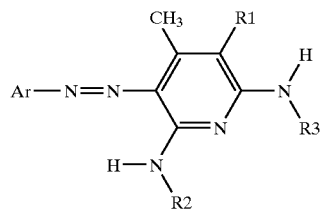

| | Ar | R1 | R2 | R3 | OP |
|---|---|---|---|---|---|
| b-1 | 3-CH₃, 4-CN, 5-CH₃, 2-EtO₂C thiophene | CN | —C₆H₄—C₈H₁₇-n | —C₆H₄—C₈H₁₇-n | 1.34 |
| b-2 | 3-CH₃, 4-CN, 5-CH₃ isothiazole | CN | —C₆H₄—C₈H₁₇-n | —C₆H₄—C₈H₁₇-n | 1.35 |
| b-3 | 3-CH₃, 4-CN, 5-CH₃ isothiazole | —CONH₂ | —C₆H₄—C₈H₁₇-n | —C₆H₄—C₈H₁₇-n | 1.15 |
| b-4 | 3-CH₃, 4-CN, 5-CH₃ isothiazole | H | 2,3,4,5-tetramethylphenyl | 2,3,4,5-tetramethylphenyl | 1.14 |
| b-5 | 2-EtS, 5-methyl-1,3,4-thiadiazole | CN | —C₆H₄—C₈H₁₇-n | —C₆H₄—C₈H₁₇-n | 1.39 |
| b-6 | 4-CH₃, 5-CN, 2-CH₃ thiazole | CN | —C₆H₄—C₈H₁₇-n | —C₆H₄—C₈H₁₇-n | 1.39 |
| b-7 | n-C₄H₉SO₂-, 5-methyl-1,3,4-thiadiazole | CN | —C₆H₄—C₈H₁₇-n | —C₆H₄—C₈H₁₇-n | 1.49 |
| b-8 | 1-CH₂CO₂C₄H₉-n, 3-Ph, 5-methyl-1,2,4-triazole | CN | —C₆H₄—C₈H₁₇-n | —C₆H₄—C₈H₁₇-n | 1.40 |
| b-9 | 3,4-dicyanophenyl | CN | —C₆H₄—C₈H₁₇-n | —C₆H₄—C₈H₁₇-n | 1.32 |

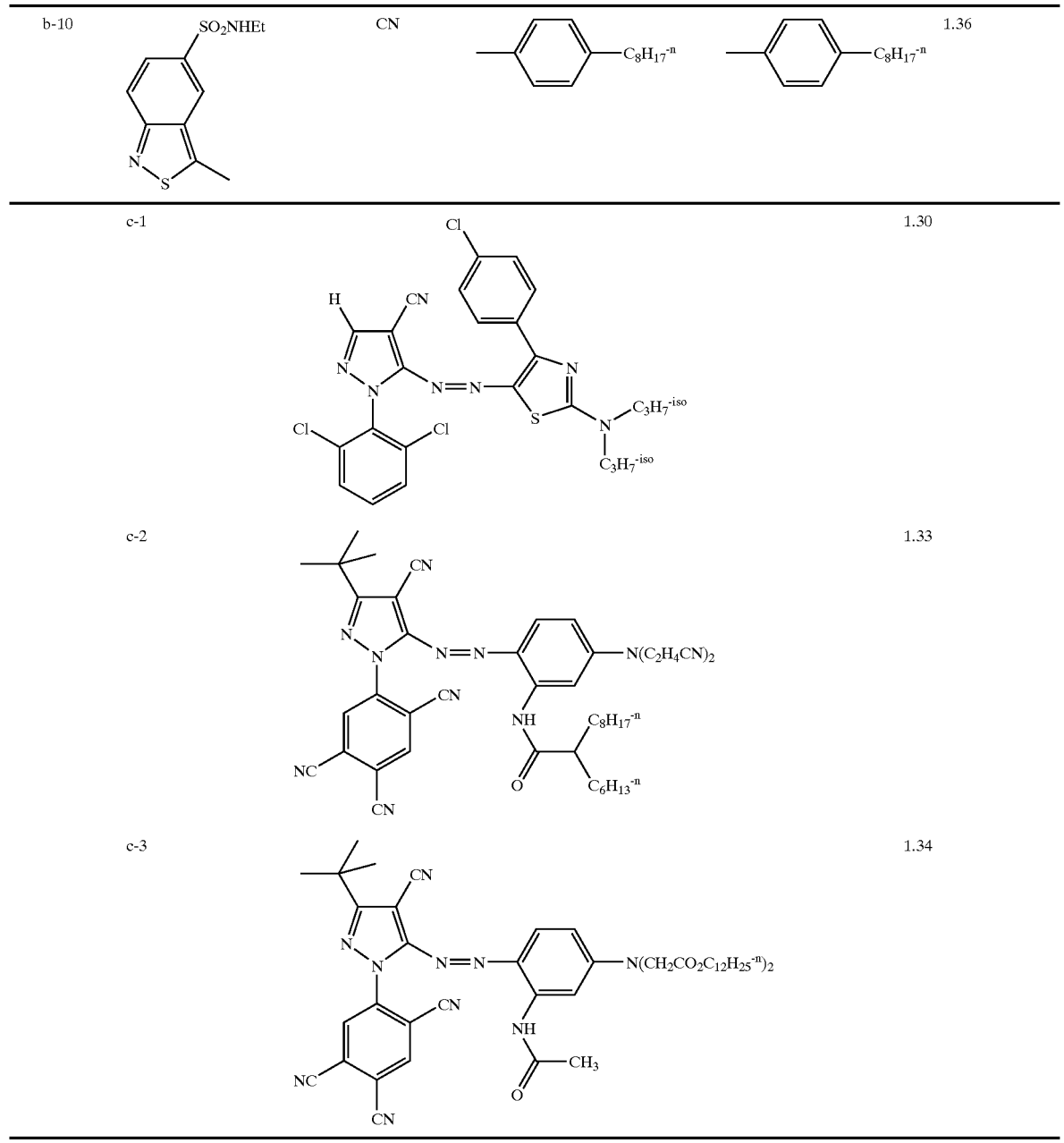

In the coloring fine particle dispersion of the present invention, the oxidation potential of the oil-soluble dye is preferably 1.0 V (vs SCE) or nobler so as to efficiently polymerize the polymerizable ethylenic unsaturated monomer. A nobler oxidation potential is more preferred and the oxidation potential is more preferably 1.1 V (vs SCE) or nobler, still more preferably 1.2 V (vs SCE) or nobler.

The oxidation potential value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler by introducing an electron-withdrawing group and becomes baser by introducing an electron-donating group.

The oxidation potential value, which is described in detail below, means a potential where an electron of compound is withdrawn at the anode in voltammetry, and this is considered to proximately agree with the HOMO energy level in the ground state of the compound.

The present inventors have studied on the ozone fastness of a colored image and found that the ozone fastness is correlated with the oxidation potential of a compound used for the colored image and by using a compound having an oxidation potential nobler than the saturated calomel electrode (SCE), the ozone fastness is enhanced.

The reason why the ozone fastness of the colored image is enhanced can be described by using the relationship between HOMO (highest occupied molecular orbital) and LUMO (lowest unoccupied molecular orbital) of compound and ozone gas. That is, the coloring agent is oxidized by the reaction of HOMO of coloring agent with LUMO of ozone gas, as a result, the colored image is considered to decrease in the ozone fastness. Therefore, the ozone fastness may be enhanced by decreasing HOMO of coloring agent and thereby lowering the reactivity with ozone gas.

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

The measurement of oxidation potential is more specifically described below. A test sample is dissolved to a concentration of $1 \times 10^{-4}$ to $1 \times 10^{-6}$ mol·dm$^{-3}$ in a solvent such as dimethylformamide or acetonitrile containing a supporting electrolyte such as sodium perchlorate or tetrapropylammonium perchlorate and the oxidation potential is measured as a value against SCE (saturated calomel electrode) using a cyclic voltammetry or a direct current polarography.

The supporting electrolyte and solvent used can be appropriately selected according to the oxidation potential or solubility of the test sample. The supporting electrolyte and solvent which can be used are described in Akira Fujishima et al., *Denkikagaku Sokutei Ho* (*Electrochemical Measuring Method*), pp. 101–118, Gihodo Shuppan Sha (1984).

The oxidation potential value sometimes deviates on the order of tens of millivolt due to the effect of liquid junction potential, liquid resistance of sample solution, or the like, however, the reproducibility of measured potential can be guaranteed by the calibration using a standard sample (for example, hydroquinone).

The oxidation potential used in the present invention is a value measured according to d.c. polarography in N,N-dimethylformamide (concentration of compound: $1 \times 10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode.

The oil-soluble dye represented by formula (M-I) of the present invention can be preferably used as the magenta dye. The dyes of formula (M-I) may be used individually or in combination of two or more thereof. A dye other than the dye of formula (M-I) may also be used in combination. As the dye used in combination, an arbitrary dye may be used in an arbitrary amount for the purpose of adjusting the color hue or the like, however, a dye having a higher oxidation potential is preferred in view of efficiency of the polymerization reaction.

Examples of the magenta dye which can be used in combination include aryl or heteryl azo dyes having phenols, naphthols or anilines as the coupling component; azomethine dyes having pyrazolones or pyrazolotriazoles as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye.

In performing full color inkjet recording by using magenta, cyan, yellow and black inkjet inks, a recording method of using the inkjet recording ink containing the oil-soluble dye represented by formula (M-I) of the present invention for the magenta ink is preferred in view of efficiency of polymerization curing, quality of recorded image and preservability of image.

The inkjet ink composition of the present invention preferably contains the dye represented by formula (M-I) in an amount of 0.1 to 20 wt %, more preferably from 0.2 to 15 wt %.

Hydrophobic Ethylenic Unsaturated Monomer

The monomer for use in the present invention is a compound having a polymerizable double bond and this compound is solidified when an energy such as ultraviolet ray, heat or electron beam is applied. The hydrophobicity means that the compound has a solubility of 10% or less, preferably 3% or less, in water. The monomer may be a so-called monofunctional compound having one ethylenic unsaturated group (hereinafter referred to as a "monofunctional monomer") or a bifunctional or greater polyfunctional compound (hereinafter referred to as a. "polyfunctional monomer"). One or more monofunctional monomer and one or more polyfunctional may be used in combination. The monomer species can be appropriately selected for the purpose of controlling the viscosity of coloring fine particle or the properties (e.g., compatibility with oil-soluble dye, strength, adhesion to substrate) of polymer after the polymerization of monomer.

The boiling point of the hydrophobic ethylenic unsaturated monomer is preferably 150° C. or more, more preferably from 160 to 300° C.

Examples of the polymerizable group include an acryloyl group, a methacryloyl group, an allyl group, a vinyl group and an inner double bonding group (e.g., maleic acid). Among these, an acryloyl group and a methacryloyl group are preferred because these have excellent polymerizability and can be cured with a small amount of initiation seed or a low energy, and an acryloyl group is more preferred.

Examples of the polyfunctional monomer include vinyl group-containing aromatic compounds, acrylates (or methacrylates) as an ester of a dihydric or greater polyhydric alcohol and an acrylic acid (or methacrylic acid), acrylamides (or methacrylamides) as an amide of a divalent or greater polyvalent amine and an acrylic acid or a methacrylic acid, polyester acrylates resulting from introducing an acrylic acid or methacrylic acid into an ester obtained by the bonding of a polybasic acid and a dihydric alcohol or into a polycaprolactone, polyether acrylates resulting from introducing an acrylic acid or a methacrylic acid into a nether obtained by the bonding of an alkylene oxide and a polyhydric alcohol, epoxy acrylates obtained by introducing an acrylic acid or a methacrylic acid into an epoxy resin or by reacting a divalent or greater polyvalent alcohol and an epoxy-containing monomer, urethane acrylates having a urethane bond, amino resin acrylates, acrylic resin acrylates, alkyd resin acrylates, spiran resin acrylates, silicone resin acrylates, reaction products of an unsaturated polyester and the above-described photopolymerizable monomer, and reaction products of a wax and the above-described polymerizable monomer. Among these, preferred are acrylates, polyester acrylates, polyether acrylates, epoxy acrylates, urethane acrylates, acrylic resin acrylates, silicone resin acrylates and reaction products of an unsaturated polyester and the above-described photopolymerizable monomer, and more preferred are acrylates, polyester acrylates, polyether acrylates, epoxy acrylates and urethane acrylates.

Specific examples of the polyfunctional monomer include divinylbenzene, trivinylcyclohexane, ethylene glycol dimethacrylate, 1,3-butanediol diacrylate, 1,6-hexanediol diacrylate, pentaerythritol triacrylate, trimethylolpropane triacrylate, dipentaerythritol hexaacrylate, 1,6-acryloylaminohexane, hydroxypivalic acid ester neopentyl glycol diacrylate, a polyester acrylate having a (meth)acryloyl group at the molecular chain terminal of a polyester comprising a dibasic acid and a dihydric alcohol and having a molecular weight of 500 to 30,000, polyethylene glycol diacrylate, an epoxy acrylate containing a bisphenol (A, S or F) skeleton and having a molecular weight of 450 to 30,000, an epoxy acrylate having a phenol novolak resin skeleton and having a molecular weight of 600 to 30,000, a reactant of a polyvalent isocyanate having a molecular weight of 350 to 30,000 and a hydroxyl group-containing (meth)acrylic-acid monomer, and a urethane-modified product having a urethane bond within the molecule.

Examples of the monofunctional monomer include substituted or unsubstituted (meth)acrylates, substituted or unsubstituted styrenes, substituted or unsubstituted acrylamides, vinyl group-containing monomers (e.g., vinylesters, vinylethers, N-vinylamide) and (meth)acrylic acid. Among these, preferred are substituted or unsubstituted (meth)acrylates, substituted or unsubstituted acrylamides, vinyl esters and vinyl ethers, and more preferred are substituted or unsubstituted (meth)acrylates and substituted or unsubstituted acrylamides.

Specific examples of the monofunctional monomer include n-butyl acrylate, tert-butyl acrylate, tert-octyl acrylate, n-hexyl acrylate, 2-ethylhexyl acrylate, n-dodecyl acrylate, benzyl acrylate, 1H,1H,2H,2H-perfluorohexyl acrylate, n-butyl methacrylate, sec-butyl methacrylate, n-hexyl methacrylate, 2-ethylhexyl methacrylate, n-dodecyl methacrylate, octadecyl methacrylate, benzyl methacrylate, hydroxybutyl acrylate, 2-chloroethyl acrylate, glycidyl acrylate, allyl acrylate, diphenyl-2-methacryloyloxyethyl phosphate, N-butoxymethylacrylamide, tert-butylacrylamide, tert-octylacrylamide, phenylacrylamide, 2-hyroxybutyl vinyl ether, styrene, methylstyrene, p-chlorostyrene, p-tert-butylstyrene, methoxystyrene, vinyl acetate, vinyl caproate, vinyl benzoate and polydimethylsiloxane monoacrylate.

-Polymerization Initiator-

Examples of the thermopolymerization initiator include azobis compounds, peroxides, hydroperoxides and redox catalysts. Specific examples thereof include inorganic persulfates such as potassium persulfate and ammonium persulfate, organic peroxides such as tert-butyl peroctoate, bezoyl peroxide, isopropyl percarbonate, 2,4-dichlorobenzoyl peroxide, methyl ethyl ketone peroxide, cumene hydroperoxide and dicumyl peroxide, 2,2'-azobisisobutyrate, 2,2'-azobisisobutyronitrile, 2,2'-azobis(2,4-dimethylvaleronitrile), 1,1'-azobis(cyclohexane-1-carbonitrile), 2,2'-azobis(2,4,4-trimethylpentane, 2,2'-azobiscyanovaleric acid, 1,1'-azobis(1-acetoxy-1-phenylethane), 2,2'-azobis(2-amidinopropane) hydrochloride, 2,2'-azobis[2-(5-methyl-2-imidazolin-2-yl)propane]hydrochloride and 2,2'-azobis{2-methyl-N-[1,1'-bis(hydroxymethyl)-2-hydroxyethyl]propionamide}.

This initiator is preferably contained in the coloring fine particle, namely, is preferably an oil-soluble compound and more preferably an azobis compound. Therefore, preferred examples of the thermopolymerization initiator include 2,2'-azobisisobutyrate, 2,2'-azobis-isobutyronitrile, 2,2'-azobis(2,4-dimethylvaleronitrile), 1,1'-azobis(cyclohexane-1-carbonitrile) and 2,2'-azobis(2,4,4-trimethylpentane).

In the present invention, when a radiation is used to let the polymerization of monomer proceed, α ray, γ ray, X ray, ultraviolet ray, visible ray, electron beam and the like can be used. Among these, ultraviolet ray and visible ray are preferred in view of cost and safety, and ultraviolet is more preferred. In the case of using ultraviolet ray, visible ray or the like as a radiation, a photopolymerization initiator is used in combination to initiate the polymerization.

The photopolymerization initiator is not particularly limited as long as the radical or other active species generated under the action of light reacts with the polymerizable double bond in the above-described monomer.

Generally known examples of the photopolymerization initiator include acetophenone derivatives, benzophenone derivatives, benzoin derivatives, benzoin ether derivatives, benzyldialkyl ketal derivatives, thioxanthone derivatives, acylphosphine oxide derivatives, metal complexes, p-dialkylaminobenzoic acid, azo compounds and peroxide compounds. Among these, preferred are acetophenone derivatives, benzyl derivatives, benzoin ether derivatives, benzyldialkyl ketal derivatives, thioxanthone derivatives and acylphosphine oxide derivatives, more preferred are acetophenone derivatives, benzoin ether derivatives, benzyldialkyl ketal derivatives and acylphosphine oxide derivatives.

Specific examples of the photopolymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketone, benzyl, benzoin, benzoin methyl ether, benzoin isopropyl ether, benzoin-n-propyl ether, benzoin isobutyl ether, benzyldimethyl ketal, 1-hydroxy-cyclohexyl phenyl ketone, tetramethylthiuram monosulfide, thioxanthone, 2-chlorothioxanthone, 2,4-dimethylthioxanthone, 2,2-dimethylpropioyldiphenyl phosphine oxide, 2-methyl-2-ethylhexanoyldiphenyl phosphine oxide, 2,6-dimethylbenzoyldiphenyl phosphine oxide, 2,6-dimethoxybenzoyldiphenylphosphine oxide, 2,4,6-trimethylbenzoyldiphenylphosphine oxide, bis(2,6-dimethoxybenzoyl)-2,4,4-trimethylpentylphosphine oxide, 2,3,6-trimethylbenzoyldiphenylphosphine oxide, bis(2,3,6-trimethylbenzoyl)phenylphosphine oxide, 2,4,6-trimethoxybenzoyldiphenylphosphine oxide, 2,4,6-trichlorobenzoyldiphenylphosphine oxide, 2,4,6-trimethylbenzoylnaphthyl phosphonate, bis ($\eta^5$-2,4-cyclopentadien-1-yl)-bis(2,6-difluoro-3-(1H-pyrrol-1-yl)-phenyl)titanium, p-dimethylaminobenzoic acid, p-diethylaminobenzoic acid, azobisisobutyronitrile, 1,1'-azobis(1-acetoxy-1-phenylethane), benzoin peroxide and di-tert-butyl peroxide.

Other examples of the photopolymerization initiator include photopolymerization initiators described in Kiyomi Kato, *Shigaisen Koka System (Ultraviolet Curing System)*, pp. 65–148, Sogo Gijutsu Center (1989).

These photopolymerization initiators may be used individually or in combination of two or more thereof. The photopolymerization initiator may also be used in combination with a sensitizer.

The amount of the photopolymerization initiator used is not particularly limited but is preferably from 0.5 to 20 wt %, more preferably from 1 to 15 wt %, still more preferably from 3 to 10 wt %, based on the hydrophobic ethylenic unsaturated monomer. If the amount used is less than 0.5 wt %, the curing does not proceed or takes a long time, whereas if it exceeds 20 wt %, precipitation or separation occurs in aging of the coloring fine particle dispersion or the performance of cured ink, such as strength or rubbing resistance, may be deteriorated and this is not preferred.

The sensitizer by itself is not activated by the irradiation of light but when used in combination with a photopolymerization initiator, a higher effect can be obtained than in the case of using the photopolymerization initiator alone. In general, amines are used. The curing rate increases by the addition of an amine, because first, the amine has a hydrogen-withdrawing activity and supplies hydrogen to the photopolymerization initiator and secondly, although the radical produced combines with an oxygen molecule in air to worsen the reactivity, the amine has an activity of capturing oxygen dissolved in the composition.

Examples of the sensitizer include amine compounds (e.g., aliphatic amine, amine containing an aromatic group, reaction product of piperidine, epoxy resin and amine, triethanolamine triacrylate), urea compounds (e.g., allylthiourea, o-tolylthiourea), sulfur compounds (e.g., sodium diethyldithiophosphate, soluble salt of aromatic sulfinic acid), nitrile-base compounds (e.g., N,N-diethyl-n-aminobenzonitrile), phosphorus compounds (e.g., tri-n-butylphosphine, sodium diethyldithiophosphide), nitrogen compounds (e.g., Michler's ketone, N-nitrosohydroxylamine derivative, oxazolidine compound, tetrahydro-1,3-oxazine compound, condensate of formaldehyde or acetaldehyde and diamine) and chlorine compounds (e.g., carbon tetrachloride, hexachloroethane).

The amount of the sensitizer used is usually from 0.1 to 10 wt %, preferably from 0.2 to 5 wt %, more preferably from 0.2 to 2 wt %. The selection, combination and blending ratio of the photopolymerization initiator and the sensitizer may be appropriately selected according to the hydrophobic ethylenic unsaturated monomer used and the apparatus used.

Examples of the light source which can be used for irradiating ultraviolet ray or visible ray include a low-pressure mercury lamp, a high-pressure mercury lamp, a metal halide lamp, a carbon arc lamp, a xenon lamp and a chemical lamp.

Other Components

In addition to the above-described polymerizable hydrophilic ethylenic unsaturated monomer, oil-soluble dye and polymerization initiator, the coloring fine particle of the present invention may appropriately contain a high boiling point hydrophobic organic solvent or a polymer for the purpose of adjusting the viscosity or polarity of the coloring fine particle itself or for adjusting the polymerization activity.

The high boiling point organic solvent is an organic solvent having a boiling point of 100° C. or more. The boiling point of the high boiling point organic solvent is preferably 150° C. or more, more preferably 170° C. or more. Examples of the high boiling point organic solvent include polyhydric alcohols, esters of aliphatic carboxylic acid, phosphoric acid esters and hydrocarbons and specific examples thereof include diethylene glycol, trimethylolpropane, dibutyl phthalate, 2-ethylhexyl benzoate and alkylnaphthalene. More specific examples include the hydrophobic high boiling point organic solvents described in Japanese Patent Application No. 2000-78518. The high boiling point organic solvent may be a liquid or a solid at an ordinary temperature and either can be used according to the purpose.

One of these solvents may be used or a plurality of these solvents may be used in combination. The amount of the solvent used is preferably from 0 to 20 wt %, more preferably from 0 to 10 wt %.

The polymer may be used for adjusting the polarity or viscosity of the coloring fine particle, for enhancing the solubility of the oil-soluble dye or for adjusting the adhesion to a recording material or light fastness of the ink after curing. The polymer preferably has high compatibility with the dye or monomer and preferably has a molecular weight of 50,000 or less, more preferably 20,000 or less. Examples of the polymer include vinyl polymers, polyurethanes and polyesters and specific examples thereof include polybutyl acrylate, poly(isobutyl methacrylate-hydroxyethyl acrylate) (copolymerization ratio: 95:5 by mass), poly(isopropyl acrylate-tetrahydrofurfuryl acrylate) (copolymerization ratio: 70:30 by mass), poly(butyl methacrylate-N-methoxymethyl acrylamide) (copolymerization ratio: 80:20 by mass) and polybutyl acrylate-polydimethylsiloxane block copolymer (copolymerization ratio: 90:10 by mass).

One of these polymers may be used or a plurality of these polymers may be used in combination. The amount of the polymer used varies depending on the kind or amount of the polymerizable ethylenic unsaturated monomer or oil-soluble dye used but is preferably from 0 to 40 wt %, more preferably from 0 to 20 wt %.

In the present invention, a storage stabilizer may be contained in the coloring fine particle or in the aqueous phase of the aqueous ink. The storage stabilizer inhibits undesired polymerization during storage and examples thereof include quaternary ammonium salts, hydroxyamines, cyclic amides, nitriles, substituted ureas, heterocyclic compounds, organic acids, hydroquinones, hydroquinone monoethers, organic phosphines and copper compounds. Specific examples thereof include benzyltrimethylammonium chloride, diethylhydroxylamine, benzothiazole, 4-amino-2,2,6,6-tetramethylpiperidine, citric acid, hydroquinone monobutyl ether and copper naphthanate. The amount of the polymer used is preferably from 0.005 to 1 wt %, more preferably from 0.01 to 0.5 wt %, still more preferably from 0.01 to 0.2 wt %, based on the polymerizable ethylenic unsaturated monomer.

-Production of Coloring Fine Particle Dispersion-

The coloring fine particle dispersion for use in the present is produced by dispersing a solution containing at least an oil-soluble dye and a hydrophobic ethylenic unsaturated monomer, in an aqueous medium, preferably by dispersing the solution further containing a polymerization initiator, in an aqueous medium. Specific examples of the method therefor include a method of co-emulsifying and dispersing the above-described oil-soluble dye and hydrophobic ethylenic unsaturated monomer (co-emulsification dispersion method). Suitable examples of the co-emulsification dispersion method include a method of emulsifying the oil-soluble dye and the hydrophobic ethylenic unsaturated monomer to form fine particles either by adding an aqueous medium to a solution (organic solvent phase) containing the oil-soluble dye and the hydrophobic ethylenic unsaturated monomer or by adding the organic solvent phase to an aqueous medium. The organic solvent phase preferably contains a dispersant. As the dispersant, the following surfactant or the like is preferably used.

As the emulsion-dispersing apparatus for use in the co-emulsification dispersion method, known devices such as simple stirrer, impeller stirring system, in-line stirring system, mill system (e.g., colloid mill) and ultrasonic system can be used. In the present invention, a high-pressure emulsion-dispersing apparatus is preferred and a high-pressure homogenizer is more preferred.

The mechanism of the high-pressure homogenizer is described in detail in U.S. Pat. No. 4,533,254 and JP-A-6-47264. Examples of the commercially available apparatus include Gaulin Homogenizer (manufactured by A. P. V Gaulin Inc.), Microfluidizer (manufactured by Microfluidex Inc.) and Altimizer (produced by Sugino Machine).

The high-pressure homogenizer with a mechanism of forming fine particles in an ultrahigh pressure jet stream recently described in U.S. Pat. No. 5,720,551 is particularly effective for the emulsion-dispersion of the present invention.

Examples of the emulsion-dispersing apparatus using this ultrahigh pressure jet stream include DeBEE2000 (manufactured by BEE International Ltd.).

In performing the emulsion-dispersion by using the high-pressure emulsion-dispersing apparatus, the pressure is preferably 50 MPa or more (500 bar or more), more preferably 60 MPa or more (600 bar or more), still more preferably 180 MPa or more (1,800 bar or more).

In the present invention, a method of, for example, performing the emulsification in a stirring emulsifier and then passing the emulsified product through a high-pressure homogenizer by using two or more emulsification devices is particularly preferred. Also, a method of once performing the emulsion-dispersion by these emulsification devices and after adding additives such as wetting agent and surfactant, again passing the dispersion through a high-pressure homogenizer during the time of filling the ink composition into a cartridge is preferred.

In the case of containing a low boiling point organic solvent in addition to the oil-soluble dye and hydrophobic ethylenic unsaturated monomer at the emulsion-dispersion, it is preferred in view of stability of the emulsified product, safety and hygiene to substantially remove the low boiling point solvent.

For substantially removing the low boiling point solvent, various known methods can be used according to the kind of the low boiling point solvent. For example, an evaporation method, a vacuum evaporation method or an ultrafiltration method can be employed. The step of removing the low boiling point organic solvent is preferably performed as soon as possible immediately after the emulsification.

At the emulsion-dispersion, various surfactants can be used. Suitable examples of the surfactant include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene-alkylsulfuric ester salt, nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer, acetylene-base polyoxyethylene oxide surfactants such as SURFYNOLS (produced by Air Products & Chemicals), amine oxide-type amphoteric surfactants such as N,N-dimethyl-N-alkylamine oxide, and surfactants described in JP-A-59-157636 (pages (37) to (38)) and *Research Disclosure*, No. 308119 (1989).

In preparing an aqueous ink by dispersing a coloring fine particle containing the oil-soluble dye and the hydrophobic ethylenic unsaturated monomer in an aqueous medium according to the co-emulsification dispersion, control of the particle size is important.

In order to elevate the color purity or density of an image formed by the inkjet recording, the average particle size of the coloring fine particles in the coloring fine particle dispersion is preferably made small. Specifically, the volume average particle size of coloring fine particles is preferably from 1 to 300 nm, more preferably from -2 to 200 nm, still more preferably from 2 to 100 nm.

Also, when a coarse particle is contained in the coloring fine particles, this may decrease the printing performance. For example, the coarse particle clogs the nozzle of head or even if the nozzle is not clogged, forms a soil to bring about failure or slippage in the ejection of ink to adversely affect the printing performance.

Accordingly, the proportion of coarse particles present is preferably lower. When an ink is prepared, it is preferred to reduce the number of particles having a particle size of 5 $\mu$m or more to 10 or less and the number of particles having a particle size of 1 $\mu$m or more to 1,000 or less, in 1 $\mu$l of the ink.

For removing these coarse particles, a known method such as centrifugal separation or microfiltration can be used. This separation step may be performed immediately after the emulsion-dispersion or may be performed immediately before the filling into an ink cartridge after various additives such as wetting agent and surfactant are added to the emulsified dispersion. Use of a mechanical emulsification apparatus is effective for reducing the average particle size of coloring fine particles and decreasing the number of coarse particles.

In the coloring fine particle dispersion for use in the present invent-ion, the content of the hydrophobic ethylenic unsaturated monomer is not particularly limited, however, in view of good permeation of ink into recording paper, the content of the hydrophobic ethylenic unsaturated monomer in the coloring fine particle dispersion is preferably 25 to 90 wt %, more preferably from 50 to 85 wt %.

Also, from the standpoint of maintaining good solubility of the oil-soluble dye, the hydrophobic ethylenic unsaturated monomer is preferably used in an amount of 30 to 2,000 parts by weight, more preferably from 100 to 1,500 parts by weight, based on the oil-soluble dye.

If the hydrophobic ethylenic unsaturated monomer is used in an excessively large amount, the ratio of the oil phase becomes excessively large and this tends to make difficult the stable and fine dispersion. When this aspect is also taken account of, the amount of the hydrophobic ethylenic unsaturated monomer used is preferably from 50 to 1,500 parts by weight, more preferably from 100 to 1,000 parts by weight, based on the oil-soluble dye.

In a preferred embodiment of the present invention, the coloring fine particle contains the above-described polymerization initiator. In this case, the coloring fine particle dispersion may be produced by a method of performing, similarly to the above, the co-emulsification dispersion of a solution containing at least the oil-soluble dye, the hydrophobic ethylenic unsaturated monomer and the polymerization initiator. However, when the polymerization initiator is a thermopolymerization initiator, the emulsion-dispersion or the removal of low boiling point organic solvent must be performed at a low temperature. This temperature is preferably 40° C. or less, more preferably 30° C. or less (preferably 0° C. or more) Alternatively, the polymerization initiator may be added directly to the coloring fine particle dispersion obtained by the emulsion-dispersion.

<Other Components>

1 The ink composition of the present invention may further contain, if desired, other components which are appropriately selected.

These other additives are added within the range of not impairing the effect of the present invention. Examples thereof include known additives such as drying inhibitor, permeation accelerator, ultraviolet absorbent, antioxidant, fungicide, pH adjusting agent, surface tension adjusting agent, defoaming agent, viscosity adjusting agent, dispersant, dispersion stabilizer, rust inhibitor and chelating agent.

The drying inhibitor is suitably used for the purpose of preventing occurrence of clogging due to drying of the ink composition at the ink jetting port of a nozzle used for the inkjet recording system.

The drying inhibitor is preferably a water-soluble organic solvent having a vapor pressure lower than water. Specific examples of the drying inhibitor include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl (or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives.

Among these, polyhydric alcohols such as glycerin and diethylene glycol are preferred. These drying inhibitors may be used individually or in combination of two or more thereof. The drying inhibitor is preferably contained in the ink composition in an amount of 10 to 50 wt %.

The permeation accelerator is suitably used for the purpose of obtaining higher permeation of the ink composition into paper.

Examples of the permeation accelerator include alcohols (e.g., ethanol, isopropanol, butanol, di(tri)ethylene glycol monobutyl ether, 1,2-hexanediol), sodium laurylsulfate, sodium oleate and nonionic surfactants.

The permeation accelerator exerts a sufficiently high effect when this is contained within the range of causing no blurring of printed letter or no print through and contained in an amount of approximately from 5 to 30 wt % in the ink composition.

The ultraviolet absorbent is used for the purpose of enhancing the preservability of image. Examples thereof include benzotriazole-base compounds described, for example, in JP-A-58-185677, JP-A-61-190537, JP-A-2-782, JP-A-5-197075 and JP-A-9-34057, benzophenone-base compounds described, for example, in JP-A-46-2784, JP-A-5-194483 and U.S. Pat. No. 3,214,463, cinnamic acid-base compounds described, for example, in JP-B-48-30492 (the term "JP-B" as used herein means an "examined Japanese patent publication"), JP-B-56-21141 and JP-A-10-88106, triazine-base compounds described, for example, in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light- and emitting fluorescent light, so-called fluorescent brightening agents, represented by stilbene-base compound and benzoxazole-base compound.

The antioxidant is used for the purpose of improving the preservability of image and, for example, various organic or metal complex-base discoloration inhibitors can be used.

Examples of the organic discoloration inhibitor include hydroquinones, alkoxyphenols, dialkoxyphenols, phenols, anilines, amines, indanes, chromans, alkoxyanilines and heterocyclic rings.

Examples of the metal complex-base discoloration inhibitor include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 1.00 wt %.

Suitable examples of the surface tension adjusting agent include nonionic, cationic and anionic surfactants. Here, the surface tension of the ink composition of the present invention is preferably from 25 to 70 mN/m, more preferably from 25 to 60 mN/m.

The viscosity of the ink composition of the present invention is preferably 30 mPa·s or less, more preferably 20 mPa·s or less, still more preferably 10 mPa·s or less.

As the defoaming agent, for example, a chelating agent represented by fluorine- or silicon-containing compounds and EDTA can also be used, if desired.

The pH adjusting agent can be suitably used for the purpose of adjusting the pH of or imparting storage stability to the coloring fine particle dispersion and is preferably added to give a pH of 4.5 to 10.0, more preferably a pH of 6 to 10.0.

Preferred examples of the basic pH adjusting agent include organic bases and inorganic alkalis and preferred examples of the acidic pH adjusting agent include organic acids and inorganic acids.

In the basic pH adjusting agent, among organic bases, triethanolamine, diethanolamine, N-methyldiethanolamine, dimethylethanolamine and the like are more preferred and among inorganic alkalis., a hydroxide, a carbonate, an ammonia and the like of alkali metal are more preferred. Among hydroxides of alkali metal, sodium hydroxide, lithium hydroxide, potassium hydroxide and the like are particularly preferred and among carbonates of alkali metal, sodium carbonate, sodium hydrogencarbonate and the like are In the acidic pH adjusting agent, among organic acids, acetic acid, propionic acid, trifluoroacetic acid, alkylsulfonic acid and the like are more preferred and among inorganic acids, hydrochloric acid, sulfuric acid, phosphoric acid and the like are more preferred.

(Inkjet Recording Method)

In the present invention, the image formation is preferably performed by an inkjet recording method using an inkjet printer. In the inkjet recording method, the recording is performed on an image-receiving material by using the ink (composition) of the present invention but the ink nozzle and the like used at the recording are not particularly limited and these can be appropriately selected according to the purpose.

<Image-Receiving Material>

The image-receiving material is not particularly limited and examples thereof include known recording materials such as plain paper, resin coated paper, ink-jet special paper, film, electrophotographic common paper, cloth, glass, metal and ceramic. Among these recording materials, inkjet special paper is preferred and those described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947 are more preferred.

In the present invention, among these image-receiving materials, the following recording paper and recording film are particularly preferred. The recording paper or film comprises a support having stacked thereon an ink-accepting layer, where other layers such as backcoat layer are also stacked, if desired. Each layer including the ink-accepting layer may be composed of one layer or may be composed of two or more layers.

The support which can be used is produced, for example, from a chemical pulp such as LBKP and NBKP, a mechanical pulp such as GP, PGW, RMP, TMP, CTMP, CMP and CGP, or a waste paper pulp such as DIP by mixing, if desired, additives such as conventionally known pigment, binder, sizing agent, fixing agent, cation agent and paper strength increasing agent and then sheeting the mixture by using various devices such as Fourdrinier paper machine and cylinder paper machine. Other than this, synthetic paper, plastic film sheet and the like may be used.

Th thickness of the support is preferably from 10 to 250 $\mu$m and the basis weight is preferably from 10 to 250 g/m$^2$.

On the support, the ink-accepting layer may be provided and the backcoat layer may be further provided, or the ink-accepting layer and the backcoat layer may be provided after providing a size press or an anchor coat layer using starch, polyvinyl alcohol or the like.

The support may also be subjected to a flattening treatment by a calendering device such as machine calender, TG calender and soft calender.

Among these supports, paper or plastic film of which both surfaces are laminated with polyolefin (for example, polyethylene, polystyrene, polyethylene terephthalate, polybutene or a copolymer thereof) is preferred.

In the polyolefin, a white pigment (for example, titanium oxide or zinc oxide) or a tinting dye (for example, cobalt blue, ultramarine or neodymium oxide) is preferably added.

The ink-accepting layer contains a pigment, an aqueous binder, a mordant, a water-proofing agent, a light fastness enhancer, a surfactant and other additives.

The pigment is preferably a white pigment. Examples of the white pigment include white inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin.

Among these white pigments, porous inorganic pigments are preferred, a synthetic amorphous silica having a large pore area and the like are more preferred.

The synthetic amorphous silica may be either a silicic acid anhydride obtained by a dry production method or a silicic acid hydrate obtained by a wet production method but is preferably a silicic acid hydrate.

Examples of the aqueous binder include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion.

These aqueous binders can be used individually or in combination of two or more thereof. Among these, polyvinyl alcohol and silanol-modified polyvinyl alcohol are preferred in view of attaching property to the pigment and peeling resistance of the ink-accepting layer.

The amount ratio by weight of the particle (pigment) to aqueous binder (PB ratio) exerts large influence on a structure and strength of the accepting layer. When the PB ratio increases, porosity, a pore area and suface area (per unit area) increase, but the density and strenghth tend to decrease.

The PB ratio of the accepting layer in the present invention is preferably 1.5:1 to 10:1, in view of a prevention of a reduction of layer strength and a crack at drying attributable to too large PB raio, and a prevention of a reduction of ink absorbing property attributable to easily fill the pore with the resin to occur the porosity decreasing, because of too small PB raio.

For example, when vapor method silica particle having a average primary particle size of 20 nm or less and the aqueous binder are completely dispersed at the PB ratio of 2:1 to 5:1 to obtain a coating solution, and the coating solution is coated on the support and then dried, a three-dimensional network is formed, in which secondary particle of the silica paticle is chain for the network. As a result, transparent and porous layer having an average pore size of 30 nm or less, porosity of 50 to 80%, a specific volume of pore of 0.5 ml/g and a surface area of 100 m$^2$/g is easily formed.

The mordant is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. The polymer mordants described in JP-A-1-161236 (pages 212 to 215) are particularly preferred. When the polymer mordant described in this patent publication is used, an image having excellent image quality can be obtained and at the same time, the light fastness of image is improved.

The water-proofing agent is effective for obtaining a water-resistant image and suitable examples thereof include cationic resins. Examples of the cationic resin include polyamidopolyamine epichlorohydrin, polyethyleneimine, polyaminesulfone, poly-dimethyldiallylammonium chloride, cation polyacrylamide and colloidal silica. Among these, polyamidopolyamine epichlorohydrin is preferred. The content of the cationic resin is preferably from 1 to 15 wt %, more preferably from 3 to 10 wt %, based on the entire solid content of the ink-accepting layer.

Examples of the light fastness enhancer include zinc sulfate, zinc oxide, hindered amine-base antioxidants and benzophenone-base or benzotriazole-base ultraviolet absorbents. Among these, zinc sulfate is preferred.

The surfactant functions as a coating aid, a releasability improver, a slipperiness improver or an antistatic agent Examples of the surfactant include those described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin).

The organic fluoro compound is described in JP-B-57-9053 (columns 8 to 17), JP-A-61-20994 and JP-A-62-135826.

Other examples of the additive include a pigment dispersant, a thickener, a defoaming agent, a dye, a fluorescent brightening agent, an antiseptic, a pH adjusting agent, a matting agent and a hardening agent.

The backcoat layer contains a white pigment, an aqueous binder and other components.

Examples of the white pigment include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion.

Other examples of the component include a defoaming agent, a foam inhibitor, a dye, a fluorescent brightening agent, an antiseptic and a water-proofing agent.

A polymer latex may be added to a constituent layer (including the backcoat layer) of the recording paper or film.

The polymer latex is used for the purpose of improving film properties, for example, stabilizing the dimension and preventing the curling, adhesion or film cracking.

The polymer latex is described in JP-A-62-245258, JP-A-62-136648 and JP-A-62-110066.

When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The image-receiving material for use in the ink-jet recording method of the present invention is not particularly limited but an image-receiving material (recording material) where an ink-accepting layer is stacked on a support and the ink-accepting layer contains a white pigment is preferred, because the image formed can have high image quality.

Many conventional disperse inks have a problem in that when a recording material comprising an ink-accepting layer containing a porous inorganic pigment such as white pigment is used, the ink exhibits bad permeability into the recording material and the dye is separated from the surface on rubbing the formed image with a hand. However, in the case of the ink of the present invention, such a problem is solved, because the coloring dispersion comprising an ethylenic unsaturated monomer and an oil-soluble dye is low in the viscosity and is oily and the ink exhibits excellent permeability.

Furthermore, in the present invention, when the ethylenic unsaturated monomer is polymerized after printing the ink, the coloring fine particle changes into a fine particle comprising a dye and a polymer. Use of the dye having an oxidation potential of 1.0 V or more of the present invention provides an effect that the polymerization can be performed with higher efficiency (for example, the polymerization is completed within a short time or the polymerization proceeds even by the application of a low energy). The change into a coloring fine particle sometimes enhances the image preservability, particularly the light fastness of image. Furthermore, the dye having a high oxidation potential itself has excellent image preservability (light fastness, ozone resistance) and therefore, the image fastness can be greatly enhanced. Accordingly, when the above-described recording material and the ink of the present invention are used, an image having high image quality, high strength and remarkably excellent image fastness can be formed.

The polymerization after printing the ink may be performed by an exposure to light or heating. The exposure to light may be performed by an exposure to UV light from, e.g., a fluorescent tube or a microwave discharge for 0.001 second to 1000 seconds; preferably 0.01 second to –100 seconds. The heating may be preformed by heater, electron beam, harogen lamp or microwave at a temperture of 40° C. to 300° C., preferably 50° C. to 100° C. for 0.01 second to 10 hours, preferably 0.1 second to 1 hour.

The inkjet recording system for use in the present invention is not particularly limited and any known system may be used, for example, an electric charge controlling system of jetting out the ink by utilizing an electrostatic induction force, a drop-on-demand system (pressure pulse system) utilizing a vibration pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated. Among these, a drop-on-demand system (pressure pulse system) utilizing a vibration pressure of a piezoelectric element is preferred.

The inkjet recording system includes a system of ejecting a large number of small-volume ink droplets of so-called photo ink having a low concentration, a system of improving the image quality by using a plurality of inks having substantially the same color hue but differing in the concentration, and a system using a colorless transparent ink.

EXAMPLES

The present invention is described in greater detail below by referring to Examples, however, the present invention is not limited to these Examples.

Example 1

Preparation of Inkjet Recording Ink

<Preparation of Disperse Ink 101 of the Present Invention>

A mixture containing 2 g of Dye (a-14), 1.28 g of sodium methyl-α-sulfopalmitate, 4 g of pentaerythritol tetraacrylate (PEG-4A) and 0.37 g of 1,1'-azobis(1-acetoxy-1-phenylethane) was dissolved in 54 g of ethyl acetate at room temperature. In the resulting solution, 50 ml of deionized water was added and the emulsification was performed at a rotation number of 10,000 revolutions/minute in a homogenizer totally in 5 cycles by a cycle of emulsification for 4 minutes→stopping for 1 minute. The resulting emulsified product was condensed until the odor of ethyl acetate was not generated, and then filtered through a 0.45-$\mu$m filter to obtain a fine emulsified product of hydrophobic Dye (a-14). To this emulsified product, diethylene glycol, glycerin, other additives and deionized water were added to obtain, as a final solution, a magenta ink (Disperse Ink 101) comprising 2 wt % of oil-soluble dye, 10 wt % of diethylene glycol, 10 wt % of glycerin, 1.0 wt % of a mono-2-butyloctanoic acid ester of polyethylene glycol (average repetition number: 12) as a surfactant, 0.006 wt % of benzotriazole and 0.2 wt % of 1,2-benzisothiazolin-3-one as an antiseptic, per 100 ml. The volume average particle size of this emulsified dispersion ink was measured using Microtrac UPA (manufactured by Nikkiso K.K.) and found to be 66 nm.

<Preparation of Disperse Inks 102 to 108 of the Present Invention and Comparative Disperse Inks 109 to 113>

Disperse Inks 102 to 108 of the present invention were prepared in the same manner as Disperse Ink 101 except that in the preparation of Disperse Ink 101, the kind and amount of oil-soluble dye and the kind of polymerization initiator were changed as shown in Table 7 below. The sodium methyl-α-sulfopalminate as a dispersant was used in an amount of giving the same ratio to the oil-soluble components (the sum total of oil-soluble dye, monomer and polymer). Also, the polymerization initiator was used in an amount of giving the same mass ratio to the amount of polymerizable ethylenic unsaturated monomer.

Comparative Disperse Inks 109 to 111 were prepared by changing the oil-soluble dye used in the preparation of Disperse Ink 101 to a dye having a low oxidation potential. Also, Comparative Disperse Inks 112 to 113 were prepared in the same manner as Disperse Ink 101 except that in the preparation of Disperse Ink 101, a high boiling point organic solvent (having no polymerizable functional group) was used in place of the ethylenic unsaturated monomer and the polymerization initiator was not used. In these Comparative Disperse Inks, the sodium methyl-α-sulfopalmitate as a dispersant was used, similarly to Disperse Inks 102 to 108, in an amount of giving the same ratio to the oil-soluble components (the sum total of oil-soluble dye, monomer and polymer).

In Disperse Inks 101 to 113, the concentrations of diethylene glycol, glycerin and other additives in the final ink were constant.

TABLE 7

| Ink No. | Oil-Soluble Dye | Oxidation Potential (V) | Monomer (or High Boiling Point Organic Solvent) | Oil-Soluble Polymer | Concentration of Dye (%) | Dye/Monomer/Polymer Ratio (by mass) | Kind and Amount (wt % based on monomer) of Polymerization Initiator | Particle Size of Dispersion (mm) | Remarks |
|---|---|---|---|---|---|---|---|---|---|
| 101 | a-14 | 1.43 | PET-4A | — | 2 | 1/2/0 | $OT_{A20}$-15 (9.3) | 66 | Invention |
| 102 | a-14 | 1.43 | PET-4A | — | 2 | 1/2/0 | $OT_{A20}$-15 (1.9) | 64 | Invention |
| 103 | a-14 | 1.43 | TMP-3A | pBMA/MAA (95/5) | 2 | 1/1.5/0.5 | $OT_{A20}$-15 (9.3) | 72 | Invention |
| 104 | a-14 | 1.43 | TMP-3A | — | 2 | 1/2/0 | $OT_{A20}$-15 (9.3) | 65 | Invention |
| 105 | a-15 | 1.41 | PET-4A | pBMA | 2 | 1/2/0.5 | $OT_{A20}$-15 (9.3) | 63 | Invention |
| 106 | a-15 | 1.41 | TMP-3A/t-BuAAm (1/1) | — | 2 | 1/4/0 | AIBN (9.3) | 82 | Invention |
| 107 | b-7 | 1.49 | DPHA/EGDMA (1/2) | — | 2 | 1/2/0 | V-601 (9.3) | 70 | Invention |
| 108 | a-2 | 1.39 | PET-4A/BMA (1/1) | pEMA | 2 | 1/3/1 | $OT_{A20}$-15 (9.3) | 77 | Invention |
| 109 | MM-1 | 0.94 | PET-4A | — | 2 | 1/2/0 | $OT_{A20}$-15 (9.3) | 69 | Comparison |
| 110 | MM-1 | 0.94 | PET-4A | — | 2 | 1/2/0 | $OT_{A20}$-15 (1.9) | 63 | Comparison |
| 111 | MM-2 | 0.82 | PET-4A | — | 2 | 1/2/0 | $OT_{A20}$-15 (9.3) | 75 | Comparison |
| 112 | a-14 | 1.43 | High Boiling Point Organic Solvent A | — | 2 | 1/2/0 | — | 63 | Comparison |
| 113 | a-14 | 1.43 | — | pBMA | 2 | 1/0/2 | — | 88 | Comparison |

Note 1)
PET-4A: pentaerythritol tetraacrylate,
TMP-3A: trimethylolpropane triacrylate
BMA: n-butyl methacrylate,
EGDMA: ethylene glycol dimethacrylate
DPHA: dipentaerythritol hexaacrylate,
t-BuAAm: N-tert-butylacrylamide
High Boiling Point Organic Solvent: a 3/5 mixture of tricresyl phosphate/tri(2,4,4-trimethylpentyl) phosphate
pBMA/MAA: butyl methacrylate/methacrylic acid copolymer,
pBMA: polybutyl methacrylate pEMA: polyethyl methacrylate
$OT_{A20}$-15: 1,1'-azobis (1-acetoxy-1-phenylethane)
AIBN: 2,2'-azobisisobutyronitrile
V-601: 2,2'-azobisisobutyrate Comparative Dye MM-1:

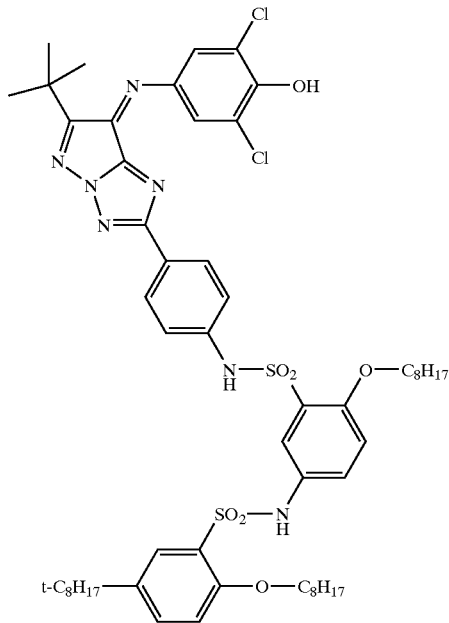

I-27 of JP-A-2001-240763, Eox=0.94 V

Comparative Dye MM-2:

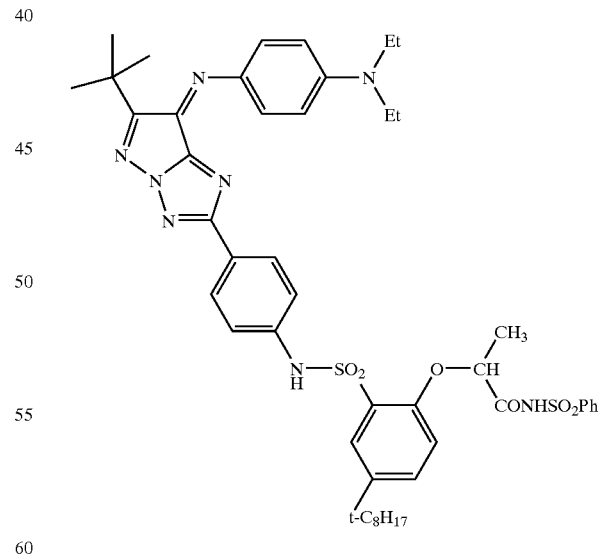

D-14 of JP-A-2002-80740, E=0.82 V

<Preparation of Ink 114>

The following materials including a water-soluble dye were mixed and filtered through a 0.45-μm filter to obtain Aqueous Inkjet Recording Ink 114 for comparison (in Ink 114, 2.8 g of Magenta Dye MM-3 was used).

| Water-soluble coloring agent | amount above |
|---|---|
| Diethylene glycol | 10 g |
| Glycerin | 10 g |
| Diethanolamine | 1 g |
| One end 2-butyloctanoic acid ester of polyethylene glycol (average ethylene oxide repetition number: 10) | 1 g |
| Water to make | 100 g |

MM-3:

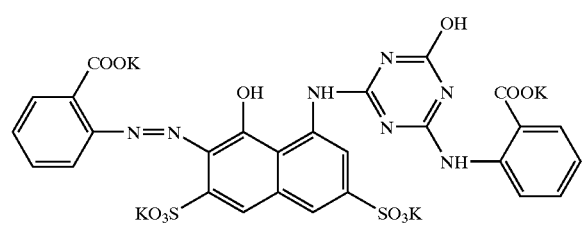

The obtained Inks 101 to 114 all were finally adjusted to pH=9 by using an aqueous KOH solution.

-Image Recording and Evaluation-

Inks 101 to 114 prepared each was filled in a cartridge of an inkjet printer PM670C (manufactured by Seiko Epson Corporation) and an image was recorded on PPC plain paper and on inkjet paper Photo-Gloss Paper EX (produced by Fuji Photo Film Co., Ltd.) by using the same printer and then heat-treated at 120° C. for 3 minutes (partially 30 seconds). The images obtained were subjected to the following evaluations. The evaluation results are shown in Table 8.

<Evaluation of Printing Performance>

The cartridge was set in the printer and after confirming the ejection of ink from all nozzles, the image was output on 10 sheets of A4-size paper. The disorder of printing was evaluated according to the following criteria.

A: Disorder of printing was not generated from the start to the end of printing.

B: Disorder of printing was occasionally generated from the start to the end of printing.

C: Printing was disordered from the start to the end of printing.

<Evaluation of Paper Dependency>

The color tone was compared between the image formed on the photo gloss paper and the image formed on the PPC plain paper. The evaluation was performed by the three-stage rating, that is, A when almost no difference was present between two images, B when the difference between two images was small, and C when the difference between two images was large.

<Stickiness of Image>

The stickiness of recorded image was evaluated. The evaluation was performed by the three-stage rating, that is, A (good) when the image was not sticking at all, B (allowable) when the image was sticking but to an extent of not soiling the material contacted, and C (bad) when the image was seriously sticking.

<Evaluation of Rubbing Resistance>

Thirty minutes after the completion of printing and heating, the image was rubbed with an eraser and the presence or absence of change in the image density was evaluated with an eye. Rating was A (good) when almost no change was observed in the density, and B (bad) when change in the density was observed.

<Evaluation of Water Resistance>

The photo gloss paper having formed thereon an image was dried at room temperature for 1 hour, dipped in water for 30 seconds and then naturally dried at room temperature. The bleeding was observed and evaluated by the three-stage rating, that is, A is no bleeding, B is slight bleeding and C is serious bleeding.

<Evaluation of Light Fastness>

On the photo gloss paper having formed thereon an image, xenon light (75,000 lx) was irradiated through a 366-nm filter for 28 days using a weather meter (Atlas C. I65). The image density at the reflection density (OD)=1.0 was measured by a reflection densitometer (X-Rite 310TR) before and after the xenon irradiation and evaluated as the dye residual percentage. The evaluation was performed by the four-stage rating, that is, A when the dye residual percentage was 90% or more, B when from 80% to less than 90%, C when from 70% to less than 80%, and D when less than 70%.

<Ozone Resistance>

In the evaluation of the ozone resistance, the density before and after the sample was stored for 7 days under the condition that the ozone concentration was 5 ppm was measured by using X-Rite 310 and the coloring agent residual percentage was determined.

The evaluation was performed by the three-stage rating, namely, A when the dye residual percentage was 85% or more, B when 85 to 70%, and C when less than 70%.

TABLE 8

| Ink No. | Thermopolymerization Conditions | Printing Performance | Paper Dependency | Stickiness | Rubbing Resistance | Water Resistance | Light Fastness | Ozone Resistance | Remarks |
|---|---|---|---|---|---|---|---|---|---|
| 101 | 120° C., 3 min. | A | A | A | A | A | A | A | Invention |
| 101 | 120° C., 30 sec. | A | A | A | A | A | A | A | Invention |
| 102 | 120° C., 3 min. | A | A | A | A | A | A | A | Invention |
| 103 | 120° C., 3 min. | A | A | A | A | A | A | A | Invention |
| 104 | 120° C., 3 min. | A | A | A | A | A | A | A | Invention |

TABLE 8-continued

| Ink No. | Thermopolymerization Conditions | Printing Performance | Paper Dependency | Stickiness | Rubbing Resistance | Water Resistance | Light Fastness | Ozone Resistance | Remarks |
|---|---|---|---|---|---|---|---|---|---|
| 105 | 120° C., 3 min. | A | A | A | A | A | A | A | Invention |
| 106 | 120° C., 3 min. | A | A | A | A | A | A | A | Invention |
| 107 | 120° C., 3 min. | A | A | A | A | A | A | A | Invention |
| 108 | 120° C., 3 min. | A | A | A | A | A | A | A | Invention |
| 109 | 120° C., 3 min. | A | A | A | A | A | B | B | Comparison |
| 109 | 120° C., 30 sec. | A | A | A | A | A | C | C | Comparison |
| 110 | 120° C., 3 min. | A | A | A | A | A | C | C | Comparison |
| 111 | 120° C., 3 min. | A | A | A | A | A | B | B | Comparison |
| 112 | (120° C., 3 min.) | A | A | A | A | A | B | B | Comparison |
| 113 | (120° C., 3 min.) | A | A | A | B | A | B | B | Comparison |
| 114 | (120° C., 3 min.) | A | B | A | A | C | D | C | Comparison |

As apparent from the results above, the ink-jet recording ink of the present invention was excellent in the printing performance and physical strength of image, free from paper dependency and stickiness, and high in the resistance against water, light and ozone. In particular, the light fastness was remarkably enhanced.

Furthermore, when the dye of formula (M-I) was used as in Inks 101 to 108 of the present invention, a very excellent image also in view of color tone was obtained.

Example 2

-Preparation of Inkjet Recording Ink-

<Preparation of Disperse Ink 201 of the Present Invention>

Disperse Ink 201 was prepared in the same manner as Disperse Ink 101 except that 0.17 g of bis(2,6-dimethoxybenzoyl)-2,4,4-trimethylpentylphosphine oxide and 0.07 g of 1-hydroxycyclohexyl phenyl ketone were used in place of the polymerization initiator used in the preparation of Disperse Ink 101 of Example 1 and 0.04 g of tetraethylenepentamine was used as a polymerization accelerator.

<Preparation of Disperse Inks 202 to 209>

Disperse Inks 202 to 207 of the present invention and Comparative Disperse Inks 208 and 209 were prepared in the same manner as Disperse 201 except that in the preparation of Disperse 201, the kind and amount of oil-soluble dye and the kind and the like of polymerization initiator were changed as shown in Table 9. The sodium methyl-α-sulfopalmitate as a dispersant was used in an amount of giving the same ratio to the oil-soluble components (the sum total of oil-soluble dye, monomer and polymer). Also, the polymerization initiator was used in an amount of giving the same mass ratio to the amount of polymerizable ethylenic unsaturated monomer.

TABLE 9

| Ink No. | Oil-Soluble Dye | Monomer (or High Boiling Point Organic Solvent) | Oil-Soluble Polymer | Concentration of Dye (%) | Dye/Monomer/Polymer Ratio (by mass) | Species of Polymerization Initiator | Particle Size of Dispersion (nm) | Remarks |
|---|---|---|---|---|---|---|---|---|
| 201 | a-14 | PET-4A | — | 2 | 1/2/0 | I-1 | 65 | Invention |
| 202 | a-14 | PET-4A | — | 2 | 1/2/0 | I-3 | 68 | Invention |
| 203 | a-14 | TMP-3A | pBMA/MAA(95/5) | 2 | 1/1.5/0.5 | I-1 | 69 | Invention |
| 204 | a-15 | TMP-3A | — | 2 | 1/2/0 | I-1 | 64 | Invention |
| 205 | a-15 | PET-4A | pBMA | 2 | 1/3/1 | I-2 | 78 | Invention |
| 206 | b-8 | PET-4A | — | 2 | 1/4/0 | I-1 | 75 | Invention |
| 207 | c-2 | PET-4A/2-EHA(2/1) | — | 2 | 1/2/0 | I-1 | 67 | Invention |
| 208 | MM-1 | PET-4A | — | 2 | 1/2/0 | I-1 | 62 | Comparison |
| 209 | MM-2 | PET-4A | — | 2 | 1/2/0 | I-1 | 69 | Comparison |

Note)
Initiator
I-1: a 7:3 mixture of bis(2,6-dimethoxybenzoyl)-2,4,4-trimethylpentylphosphine oxide: 1-hydroxycyclohexyl phenyl ketone
I-2: 1-hydroxycyclohexyl phenyl ketone
I-3: 1,1-dimethoxy-1-phenylacetophenone
2-EHA: 2-ethylhexyl acrylate
Other abbreviations are the same as in Table 7.

-Image Recording and Evaluation-

Disperse Inks 201 to 209 prepared and Comparative Inks 112 to 114 used in Example 1 each was filled in a cartridge of an inkjet printer PM670C (manufactured by Seiko Epson Corporation) and an image was recorded on PPC plain paper and on inkjet paper Photo-Gloss Paper EX (produced by Fuji Photo., Ltd.) by using the same printer and then exposed at 700 mJ/cm$^2$ (partially 200 mJ/cm$^2$ by using a metal halide lamp.

The images obtained were subjected to the same evaluations as in Example 1. The results are shown in Table 10.

TABLE 10

| Ink No. | Exposure Condition | Printing Performance | Paper Dependency | Stickiness | Rubbing Resistance | Water Resistance | Light Fastness | Ozone Resistance | Remarks |
|---|---|---|---|---|---|---|---|---|---|
| 201 | 700 mJ/cm² | A | A | A | A | A | A | A | Invention |
| 201 | 200 mJ/cm² | A | A | A | A | A | A | A | Invention |
| 202 | 700 mJ/cm² | A | A | A | A | A | A | A | Invention |
| 203 | 700 mJ/cm² | A | A | A | A | A | A | A | Invention |
| 204 | 700 mJ/cm² | A | A | A | A | A | A | A | Invention |
| 205 | 700 mJ/cm² | A | A | A | A | A | A | A | Invention |
| 206 | 700 mJ/cm² | A | A | A | A | A | A | A | Invention |
| 207 | 700 mJ/cm² | A | A | A | A | A | A | A | Invention |
| 208 | 700 mJ/cm² | A | A | A | A | A | B | B | Comparison |
| 208 | 200 mJ/cm² | A | A | A | A | A | C | C | Comparison |
| 209 | 700 mJ/cm² | A | A | A | A | A | B | B | Comparison |
| 112 | (700 mJ/cm²) | A | A | A | A | A | B | B | Comparison |
| 113 | (700 mJ/cm²) | A | A | A | B | A | B | B | Comparison |
| 114 | (700 mJ/cm²) | A | B | A | A | C | D | C | Comparison |

The inkjet recording ink of the present invention employing a system of using a UV-curable polymerization initiator was also excellent in the printing performance and physical strength of image, free from paper dependency and stickiness, and high in the resistance against water, light and ozone. In particular, the light fastness was remarkably enhanced. Furthermore, similarly to Example 1, when the dye of formula (M-I) was used as in Inks. 201 to 206, a very excellent image also in view of color tone was obtained.

Example 3

Using each of Disperse Inks 101 to 108 and 201 to 207 of the present invention and Comparative Inks 109 to 114, 208 and 209 prepared in Examples 1 and 2, printing was performed by changing the recording material (support) to electrophotographic paper, plain paper (general copy paper), polyester film (OHP paper) and aluminum-deposited film (printed on the aluminum side). The obtained image was heated or exposed in the same manner as in Example 1 or 2. As a result, the ink of the present invention was verified to have excellent printing performance and high resistance against water, light and ozone, similarly to the above. Particularly, at the printing on polyester film or aluminum-deposited film as the recording material, conventional water-soluble dye ink exhibited poor water resistance, solvent disperse ink exhibited stickiness and polymer disperse ink exhibited very bad rubbing resistance, whereas the ink of the present invention gave, with a lower energy (short-time heating at 120° C. for 30 seconds or exposure at 200 mJ/cm² or less), an image improved in the stickiness, prevented from separation on rubbing with a finger, excellent in the resistance against water and solvent and also excellent in the light fastness.

According to the present invention, an inkjet ink and an inkjet recording method are obtained, where the handleability, safety and dispersion stability of coloring fine particle are excellent, the substrate dependency is not present, the printing on a freely selected substrate is ensured with excellent coloration/color tone, good resistance against water and light and no soiling immediately after printing, and the dye exhibits excellent stability in aging of ink. Also, an inkjet ink which exhibits, at the printing particularly on paper, excellent ink permeability to eliminate the problem of soiling immediately after printing, can be polymerized in higher sensitivity after printing, and enables the recording of an image excellent in water resistance and light fastness through polymerization curing, is obtained.

The entire disclosure of each and every foreign patent application: Japanese Patent Application No. 2002-342249, from which the benefit of foreign priority has been claimed in the present application is incorporated herein by reference, as if fully set forth.

What is claimed is:

1. An inkjet ink comprising:
a coloring fine particle dispersion containing at least one oil-soluble dye;
a polymerizable hydrophobic ethylenic unsaturated monomer; and
a polymerization initiator,
wherein the at least one oil-soluble dye has an oxidation potential of 1.0 V or more.

2. The inkjet ink as claimed in claim 1, wherein the at least one oil-soluble dye is a compound represented by the following formula (M-I):

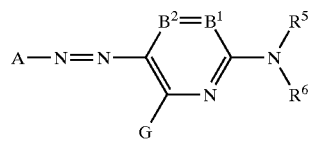

wherein A represents a residue of a 5-membered heterocyclic diazo component A-NH$_2$; B$^1$ and B$^2$ each represents —CR$^1$— or —CR$^2$— or either one of B$^1$ and B$^2$ represents a nitrogen atom and the other represents —CR$^1$— or —CR$^2$—; R$^5$ and R$^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that R$^5$ and R$^6$ are not a hydrogen atom at the same time; G, R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group or a heterocyclic thio group, and each group may be further substituted; and $R^1$ and $R^5$, or $R^5$ and $R^6$ may combine to form a 5- or 6-membered ring.

3. The inkjet ink as claimed in claim 1, wherein the coloring fine particle dispersion contains the ethylenic unsaturated monomer in an amount of from 25 to 90 wt %.

4. The inkjet ink as claimed in claim 1, wherein the coloring fine particle dispersion contains the polymerization initiator.

5. The inkjet ink as claimed in claim 1, wherein the polymerization initiator is a polymerization initiator capable of generating a radical on heating or irradiation of an ultraviolet ray.

6. The inkjet ink as claimed in claim 1, wherein the hydrophobic ethylenic unsaturated monomer has a boiling point of 150° C. or more.

7. The inkjet ink as claimed in claim 1, wherein coloring fine particles in the coloring fine particle dispersion have a volume average particle size of from 1 to 300 nm.

8. The inkjet ink as claimed in claim 1, which has a viscosity of 10 mPa·s or less.

9. The inkjet ink as claimed in claim 2, wherein the compound represented by formula (M-I) is a compound represented by the following formula (M-II):

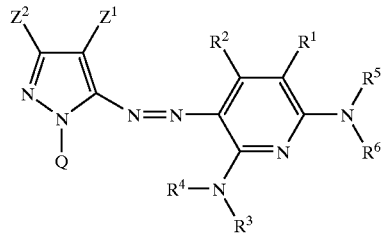

whererin $Z^1$ represents an electron-withdrawing group having a Hammett's substituent constant σp value of 0.20 or more; $R^1$, $R^2$, $R^5$ and $R^6$ have the same meanings as in the formula (M-I), respectively; $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; $Z^2$ represents a hydrogen atom, an aliphatic group, an aromatic group or a heterocyclic group;

Q represents a hydrogen atom, an aliphatic group, an aromatic group or a heterocyclic group.

* * * * *